US012694480B2

(12) United States Patent
Escolano et al.

(10) Patent No.: US 12,694,480 B2
(45) Date of Patent: Jul. 28, 2026

(54) HIGH-RESOLUTION MULTIVIEW-CONSISTENT RENDERING AND ALPHA MATTING FROM SPARSE VIEWS

(71) Applicant: GOOGLE LLC, Mountain View, CA (US)

(72) Inventors: Sergio Orts Escolano, Zurich (CH); Zhiwen Fan, Austin, TX (US); Di Qiu, Kitchener (CA); Yinda Zhang, Palo Alto, CA (US); Daoye Wang, Zurich (CH); Erroll Wood, Cambridge (GB); Abhimitra Meka, San Francisco, CA (US); Hossam Isack, Oakland, CA (US); Paulo Fabiano Urnau Gotardo, Zurich (CH); Kripasindhu Sarkar, Zurich (CH); Thabo Beeler, Egg (CH); Zhengyang Shen, Sunnyvale, CA (US); Alexander Sahba Koumis, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 201 days.

(21) Appl. No.: 18/477,219

(22) Filed: Sep. 28, 2023

(65) Prior Publication Data
US 2025/0111477 A1     Apr. 3, 2025

(51) Int. Cl.
| | |
|---|---|
| *G06T 5/50* | (2006.01) |
| *G06T 7/194* | (2017.01) |
| *H04N 5/272* | (2006.01) |

(52) U.S. Cl.
CPC .............. *G06T 5/50* (2013.01); *G06T 7/194* (2017.01); *H04N 5/272* (2013.01); *G06T 2207/20084* (2013.01); *G06T 2207/20221* (2013.01)

(58) Field of Classification Search
CPC . G06T 5/50; G06T 7/194; G06T 2207/20084; G06T 2207/20221; G06T 2207/20081; G06T 5/60; H04N 5/272
See application file for complete search history.

(56) References Cited

U.S. PATENT DOCUMENTS

| | | | |
|---|---|---|---|
| 6,363,170 B1 | 3/2002 | Seitz et al. | |
| 2023/0169658 A1* | 6/2023 | Rhodes | H04N 5/275 |
| | | | 382/164 |
| 2024/0095929 A1* | 3/2024 | Sharma | G06T 7/194 |

FOREIGN PATENT DOCUMENTS

| | | | |
|---|---|---|---|
| CN | 109215085 B | * 9/2021 | G06T 7/80 |

OTHER PUBLICATIONS

Hasinoff et al., Boundary Matting for View Synthesis, Preprint submitted to Elsevier Science, Oct. 26, 2005, 21 pages. Downloaded from https://people.csail.mit.edu/hasinoff/pubs/hasinoff-matting-preprint-2006.pdf on Jun. 13, 2025. (Year: 2005).*

(Continued)

*Primary Examiner* — Haixia Du
(74) *Attorney, Agent, or Firm* — Brake Hughes Bellermann LLP

(57) ABSTRACT

A method including capturing a first plurality of images that include a foreground object and a background, capturing a second plurality of images that include the background, generating an alpha matte based on the first plurality of images and the second plurality of images using a trained machine learned model trained using a loss function configured to cause the trained machine learned model to learn high-frequency details of the foreground object, generating a foreground object image based on the first plurality of images and the second plurality of images using the trained machine learned model, and synthesizing an image including the foreground object image and a second background scene using the alpha matte.

20 Claims, 7 Drawing Sheets

(56) References Cited

OTHER PUBLICATIONS

Zhu et al., Semi-Supervised Wide-Angle Portraits Correction by Multi-Scale Transformer, 2022 IEEE/CVF Conference on Computer Vision and Pattern Recognition (CVPR), pp. 19657-19666. (Year: 2022).*

Zhai et al., BeautyNet: Joint Multiscale CNN and Transfer Learning Method for Unconstrained Facial Beauty Prediction, Computational Intelligence and Neuroscience, vol. 2019, Article ID 1910624, 14 pages (Year: 2019).*

Aliev, Kara-Ali , "Neural Point-Based Graphics", arXiv:1906. 08240v3 (https://doi.org/10.48550/arXiv.1906.08240), Apr. 5, 2020, 16 pages.

Attal, Benjamin , "Leanring Neural Light Fields With Ray-Space Embedding", arXiv:2112.01523v3 (https://doi.org/10.48550/arXiv. 2112.01523), May 10, 2022, 14 pages.

Barron, Jonathan T., "MIP-NERF 360: Unbounded Anti-Aliased Neural Radiance Fields", arXiv:2111.12077v3 (https://doi.org/10. 48550/arXiv.2111.12077), Mar. 25, 2022, 18 pages.

Barron, Jonathan T., "MIP-NERF: A Multiscale Representation for Anti-Aliasing Neural Radiance Fields", In Proceedings of the IEEE/CVF International Conference on Computer Vision (https:// doi.org/10.48550/arXiv.2103.13415), 2021, pp. 5855-5864.

Chen, Tianlong , "AUG-NERF: Training Stronger Neural Radiance Fields With Triple-Level Physically-Grounded Augmentations", In Proceedings fo the IEEE/CVF Conference on Computer Vision and Pattern Recognition, 2022, pp. 15191-15202.

Chinbane, Julian , "Implicit Functions in Feature Space for 3D Shape Reconstruction and Completion", In Proceedings of the IEEE/CVF Conference on Computer Vision and Pattern Recognition, 2020, pp. 6970-6981.

Fan, Zhiwen , "NERF-SOS: Any-View Self-Supervised Object Segmentation on Complex Scenes", arXiv:2209.08776v6 (https:// doi.org/10.48550/ARXIV.2209.08776), Oct. 12, 2022, 17 pages.

Feng, Brandon Yushan, "SIGNET: Efficient Neural Representation for Light Fields", 2021 IEEE/CVF International Conference on Computer Vision (ICCV), 2021, pp. 14224-14233.

Fridovich-Keil, Sara , "PLENOXELS: Radiance Fields Without Neural Networks", In Proceedings of the IEEE/CVF Conference on Computer Vision and Pattern Recognition, 2022, pp. 5501-5510.

Gafni, Guy , "Dynamic Neural Radiance Fields for Monocular 4D Facial Avatar Reconstruction", In Proceedings of the IEEE/CVF Conference on Computer Vision and Pattern Recognition; qafniquy. github.10/4D-Facial-Avatars, 2021, pp. 8649-8658.

Garbin, Stephan J., "FASTNERF: High-Fidelity Neural Rendering at 200FPS", In Proceedings of the IEEE/CVF Conference on Computer Vision and Pattern Recognition; https://microsoft.github. 10/FastNeRF, 2021, pp. 14346-14355.

Gu, Xiaodong , "Cascade Cost Volume for High-Resolution Multi-View Stereo and Stereo Matching", In Proceedings of the IEEE/ CVF Conference on Computer Vision and Pattern Recognition; https://github.com/alibaba/cascade-stereo, 2020, pp. 2495-2504.

He, Kaiming , "Deep Residual Learning for Image Recognition", In Proceedings of the IEEE/CVF Conference on Computer Vision and Pattern Recognition; http://image-net.org.challenges/LSVRC/2015/ and http://macoco.org/dataset/#detections-challenge2015, 2016, pp. 770-778.

Hedman, Peter , "Baking Neural Radiance Fields for Real-Time View Synthesis", In Proceedings of the IEEE/CVF Conference on Computer Vision and Pattern Recognition, 2021, pp. 5875-5884.

Hu, Tao , "EFFICIENTNERF: Efficient Neural Radiance Fields", arXiv:2206.00878v1, Jun. 2, 2022, 10 pages.

Ke, Zhanghan , "MODNET: Real-Time Trimap-Free Portrait Matting Via Objective Decomposition", The Thirty-Sixth AAAI Conference on Artificial Intelligence (AAAI-22), 2022, pp. 1140-1147.

Li, Jizhizi , "Deep Image Matting: a Comprehensive Survey", arXiv:2304.04672v1, Apr. 10, 2023, 20 pages.

Li, Tianye , "Neural 3D Video Synthesis From Multi-View Video", In Proceedings of the IEEE/CVF Conference on Computer Vision and Pattern Recognition; https://neural-3d-video.github.io/, 2022, pp. 5521-5531.

Lin, Shanchuan , "Real-Time High-Resolution Background Matting", In Proceedings of the IEEE/CVF Conference on Computer Vision and Pattern Recognition, 2021, pp. 8762-8771.

Lin, Zhi-Hao , "NEURMIPS: Neural Mixture of Planar Experts for View Synthesis", arXiv:2204.13696v1, Apr. 28, 2022, 23 pages.

Liu, Lingjie , "Neural Sparse Voxel Fields", 34th Conference on Neural Informational Processing Systems (NeurIPS 2020), 2020, 13 pages.

Liu, Xinhang , "Unsupervised Multi-View Object Segmentation Using Readiance Field Propagation", 36th Conference on Neural Informational Processing Systems (NeurIPS 2022); arXiv:2210. 00489v2, Oct. 19, 2022, 23 pages.

Liu, Yuan , "Neural Rays for Occlusion-Aware Image-Based Rendering", In Proceedings of the IEEE/CVF Conference on Computer Vision and Pattern Recognition, 2022, pp. 7824-7833.

Lombardi, Stephen , "Deep Appearance Models for Face Rendering", ACM Transactions on Graphics, vol. 37, No. 4, Article 68, Aug. 2018, 13 pages.

Lombardi, Stephen , "Mixture of Volumetric Primitives for Efficient Neural Rendering", ACM Trans. Grph., vol. 40, No. 4, Article 59; arXiv:2103.01954v2, Aug. 2021, 13 pages.

Luo, Haimin , "Convolutional Neural Opacity Radiance Fields", In 2021 IEEE International Conference on Computational Photography (ICCP); arXiv:2104.01772v1, Apr. 5, 2021, 12 pages.

Martin-Brualla, Ricardo , "Nerf in the Wild: Neural Radiance Fields for Unconstrained Photo Collections", In Proceedings of the IEEE/ CVF Conference on Computer Vision and Pattern Recognition, 2021, pp. 7210-7219.

Matusik, Wojciech , "Image-Based 3D Photography Using Opacity Hulls", ACM Trans. Grapho. 21, 3; https://doi.org/10.1145/566654. 566599, 2002, 11 pages.

Mescheder, Lars , "Occupancy Networks: Learning 3D Reconstruction in Function Space", In Proceedings of the IEEE/CVF Conference on Computer Vision and Pattern Recognition; https://doi.org/ 10.1109/CVPR.2019.00459, 2019, pp. 4460-4470.

Mildenhall, Ben , "NERF: Representing Scenes as Neural Radiance Fields for View Synthesis", Communications of the ACM; vol. 65, No. 3; DOI: 10.1145/3503250, Jan. 2022, pp. 99-106.

Mueller, Thomas , "Instant Neural Graphics Primitives With a Multiresolution Hash Encoding", ACM Trans. Graph, vol. 41, No. 4, Article 102, Jul. 2022, 15 pages.

Nam, Giljoo , "Strand-Accurate Multi-View Hair Capture", In Proceedings of the IEEE/CVF Conference on Computer Vision and Pattern Recognition, 2019, pp. 155-164.

Niemeyer, Michael , "REGNERF: Regularizing Neural Radiance Fields for View Synthesis From Sparse Inputs", In Proceedings of the IEEE/CVF Conference on Computer Vision and Pattern Recognition, 2022, pp. 5480-5490.

Park, Jeong Joon, "DEEPSDF: Learning Continuous Signed Distance Functions for Shape Representation", In Proceedings of the IEEE/CVF Conference on Computer Vision and Pattern Recognition; https://doi.org/10.1109/CVPR.2019.00025, 2019, pp. 165-174.

Park, Keunhong , "NERFIES: Deformable Neural Radiance Fields", In Proceedings of the IEEE/CVF Conference on Computer Vision and Pattern Recognition, 2021, pp. 5865-5874.

Penner, Eric , "Soft 3D Reconstruction for View Synthesis", ACM Transactions on Graphics, vol. 36, No. 6, Article 235, Nov. 2017, 11 pages.

Pumarola, Albert , "D-NERF: Neural Radiance Fields for Dynamic Scenes", In Proceedings of the IEEE/CVF Conference on Computer Vision and Pattern Recognition, 2021, pp. 10318-10327.

Reiser, Christian , "KILONERF: Speeding up Neural Radiance Fields With Thousands of Tiny MLPS", In Proceedings of the IEEE/CVF International Conference on Computer Vision, 2021, pp. 14335-14345.

Ren, Zhongzheng , "Neural Volumetric Object Selection", In Proceedings of the IEEE/CVF Conference on Computer Vision and Pattern Recognition, 2022, pp. 6133-6142.

(56)            References Cited

OTHER PUBLICATIONS

Rhemann, Christoph , "A Perceptually Motivated Online Benchmark for Image Matting", In 2009 IEEE Computer Society Conference on Computer Vision and Pattern Recognition Workshops, CVPR Workshops 2009, vol. 2009, 2009, 8 pages.
Riegler, Gernot , "Free View Synthesis", arXiv.org (https://arxiv.org/abs/2008.05511), Aug. 12, 2020, 17 pages.
Riegler, Gernot , "Stable View Synthesis", In Proceedings of the IEEE/CVF Conference on Computer Vision and Pattern Recognition, 2021, pp. 12216-12225.
Ronneberger, Olaf , "U-NET: Convolutional Networks for Biomedical Image Segmentation", arXiv:1505.04597v1, May 18, 2015, 8 pages.
Saito, Shunsuke , "PIFU: Pixel-Aligned Implicit Function for High-Resolution Clothed Human Digitization", In Proceedings of the IEEE/CVF international Conference on Computer Vision; https://doi.org/10.1109/ICCV.2019.00239, 2019, pp. 2304-2314.
Sengupta, Soumyadip , "Background Matting: the World is Your Green Screen", arXiv:2004.00626v2, Apr. 10, 2020, 16 pages.
Shrestha, Rakesh , "MESHMVS: Multi-View Stereo Guided Mesh Reconstruction", arXiv:2010.08682v3, Apr. 11, 2021, 14 pages.
Sitzmann, Vincent , "Implicit Neural Representations With Periodic Activation Functions", 34th Conference on Neural Information Processing Systems (NeurIPS 2020), 2020, 12 pages.
Sitzmann, Vincent , "Light Field Networks: Neural Scene Representations With Single-Evaluation Rendering", 35th Conference on Neural Information Processing Systems (NeurIPS 2021); arXiv:2106.02634v2;, Jan. 18, 2022, 13 pages.
Srinivasan, Pratul P., "Lighthouse: Predicting Lighting Volumes for Spatially-Coherent Illumination", In Proceedings of the IEEE/CVF Conference on Computer Vision and Pattern Recognition, 2020, pp. 8080-8089.
Srinivasan, Pratul P., "Pushing the Boundaries of View Extrapolation With Multiplane Images", In Proceedings of the IEEE/CVF Conference on Computer Vision and Pattern Recognition, 2019, pp. 175-184.
Sun, Cheng , "Direct Voxel Grid Optimization: Super-Fast Convergence for Radiance Fields Reconstruction", In Proceedings of the IEEE/CVF Conference on Computer Vision and Pattern Recognition, 2022, pp. 5459-5469.
Tancik, Matthew , "BLOCK-NERF: Scalable Large Scene Neural View Synthesis". In Proceedings of the IEEE/CVF Conference on Computer Vision and Pattern Recognition, 2022, pp. 8248-8258.
Tancik, Matthew , "Fourier Features Let Networks Learn High Frequency Functions in Low Dimensional Domains", 34th Conference on Neural Information Processing Systems (NeurIPS 2020), 2020, 11 pages.
Wang, Cen , "Neural Opacity Point Cloud", IEEE Transactions on Pattern Analysis and Machine Intelligence 42, 7 (2020), 2020, 12 pages.
Wang, Huan , "R2L: Distilling Neural Radiance Field to Neural Light Field for Efficient Novel View Synthesis", In European Conference on Computer Vision; Springer, 2022, 17 pages.

Wang, Jue , "Image and Video Matting: a Survey", Foundations and TrendsR in Computer Graphics and Vission 3, 2 (2008), 2008, 80 pages.
Wang, Zhou , "Image Quality Assessment: From Error Visibility to Structural Similarity", IEEE Transactions on Image Processing, vol. 13, No. 4, Apr. 2004, 14 pages.
Wang, Ziyan , "HVH: Learning a Hybrid Neural Volumetric Representation for Dynamic Hair Performance Capture", Proceedings of the IEEE/CVF Conference on Computer Vision and Pattern Recognition, 2022, pp. 6143-6154.
Wei, Yi , "NERFINGMVS: Guided Optimization of Neural Radiance Fields for Indoor Multi-View Stereo", In Proceedings of the IEEE/CVF International Conference on Computer Vision, 2021, pp. 5610-5619.
Wood, Erroll , "Fake It Till You Make It: Face Analysis in the Wild Using Synthetic Data Alone", arXiv:2109.15102v2, Oct. 5, 2021, 11 pages.
Wu, Minye , "Multi-View Neural Human Rendering", In Proceedings of the IEEE/CVF Conference on Computer Vision and Pattern Recognition, 2020, pp. 1682-1691.
Xian, Wenqi , "Space-Time Neural Irradiance Fields for Free-Viewpoint Video", In Proceedings of the IEEE/CVF Conference on Computer Vision and Pattern Recognition, 2021, pp. 9421-9431.
Xiangli, Yuanbo , "BUNGEENERF: Progressive Neural Radiance Field for Extreme Multi-Scale Scene Rendering", In The European Conference on Computer Vision (ECCV), vol. 2, 2022, 17 pages.
Xu, Zexiang , "Dynamic Hair Capture Using Spacetime Optimization", In Proceedings of the IEEE/CVF Conference on Computer Vision and Pattern Recognition, ACM TOG 33, 2014, 11 pages.
Yao, Yao , "MVSNET: Depth Inference for Unstructured Multi-View Stereo", In Proceedings of the European Conference on Computer Vision (ECCV), 2018, 17 pages.
Yeh, Yu-Ying , "Learning to Relight Portrait Images Via a Virtual Light Stage and Synthetic-to-Real Adaptation", ACM Trans. Graph, vol. 41, No. 6, Article 231, Dec. 2022, 21 pages.
Yu, Alex , "Plenoctrees for Real-Time Rendering of Neural Radiance Fields", In Proceedings of the IEEE/CVF International Conference on Computer Vision, 2021, pp. 5752-5761.
Zhang, Jian , "Digging Into Radiance Grid for Real-Time View Synthesis With Detail Preservation", In European Conference on Computer Vision. Springer, 2022, 17 pages.
Zhang, Kai , "NERF++: Analyzing and Improving Neural Radiance Fields", arXiv:2010.07492v2, Oct. 21, 2020, 9 pages.
Zhang, Richard , "The Unreasonable Effectiveness of Deep Features as a Perceptual Metric", Proceedings of the Conference on Computer Vision and Pattern Recognition, 2018, pp. 586-595.
Zhi, Shuaifeng , "In-Place Scene Labelling and Understanding With Implicit Scene Representation", In Proceedings of the International Conference on Computer Vision (ICCV), 2021, pp. 15838-15847.
Zhou, Tinghui , "Stereo Magnification: Learning View Synthesis Using Multiplane Images", ACM Transactions on Graphics, vol. 37, No. 4, Article 65; arXiv:1805.09817v1, Aug. 2018, 12 Pages.

* cited by examiner

Capture a sparse-view images — S305

Capture background images — S310

Generating an alpha matte and a foreground object image based on the sparse-view images and the background images — S315 synthesize an image including the foreground object image and a selected background image using the alpha matte — S320

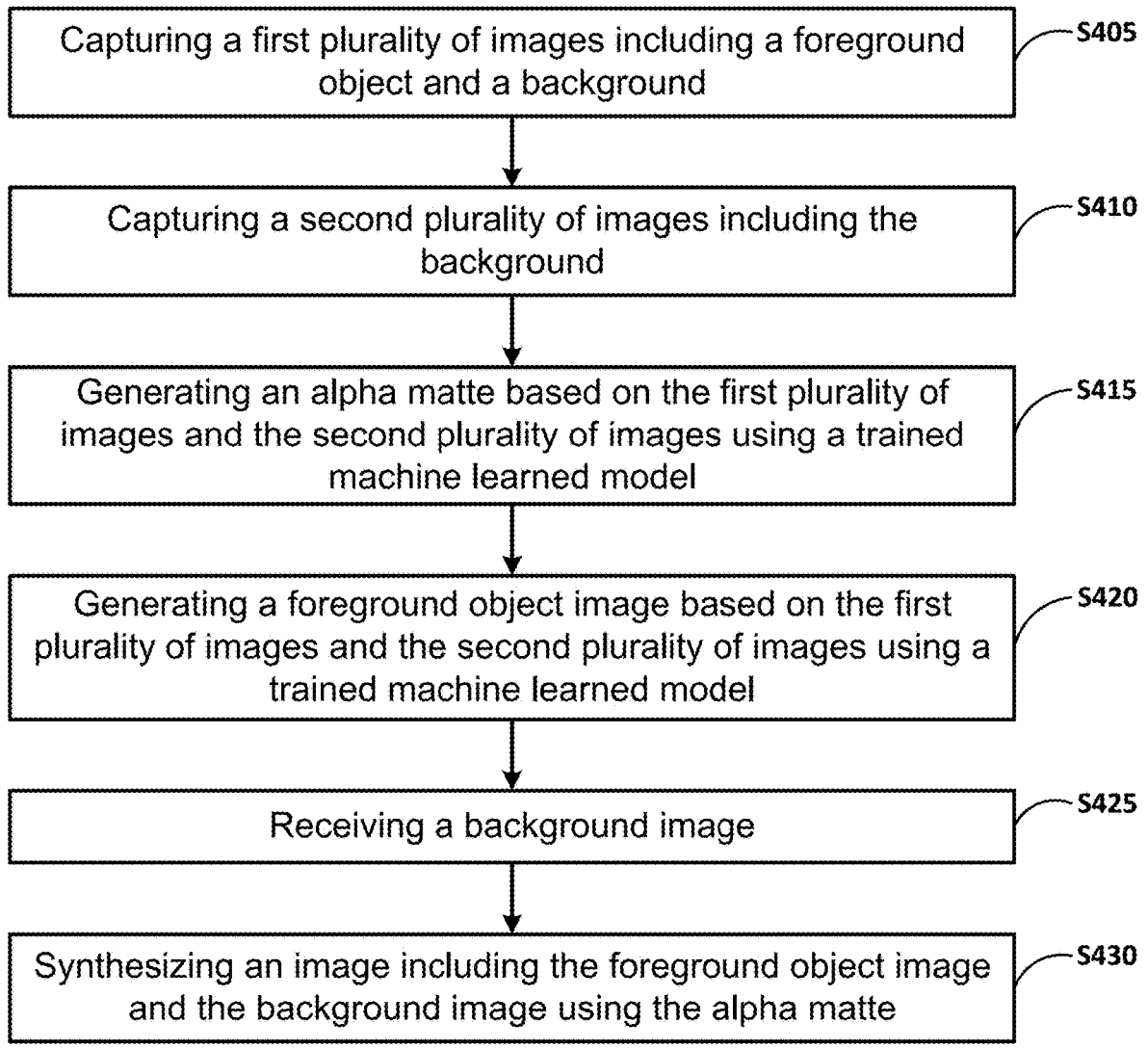

Capturing a first plurality of images including a foreground object and a background — S405

Capturing a second plurality of images including the background — S410

Generating an alpha matte based on the first plurality of images and the second plurality of images using a trained machine learned model — S415

Generating a foreground object image based on the first plurality of images and the second plurality of images using a trained machine learned model — S420

Receiving a background image — S425

Synthesizing an image including the foreground object image and the background image using the alpha matte — S430

FIG. 4

HIGH-RESOLUTION MULTIVIEW-CONSISTENT RENDERING AND ALPHA MATTING FROM SPARSE VIEWS

FIELD

Implementations relate to synthesizing and/or generating photorealistic images.

BACKGROUND

The video, movie, and/or image creation industry has created free-viewpoint and high-resolution renderings of human heads using expensive capture systems. These capture systems usually contain hundreds of cameras, color and/or depth, LED panels and the like, followed by expensive post-processing (in many cases involving an artist in the process) to achieve high-fidelity. The video, movie, and/or image creation industry have been trying to create free-viewpoint renderings and corresponding alpha mattes using video streams from a dense number of cameras, which significantly simplify the hardware dependency. However, generating photorealistic and accurate results has proven to be difficult.

SUMMARY

Example implementations can relate to background replacement for still images. The technique uses background images for modeling foreground objects in another image. A set of background images and a set of images including foreground objects can be captured by the same camera rig (sparse-view or minimal number of cameras). A machine learning model can be trained using the background images and the images including foreground objects. The trained machine learning model can further generate an alpha matte that can be used in the background replacement process.

In a general aspect, a device, a system, a non-transitory computer-readable medium (having stored thereon computer executable program code which can be executed on a computer system), and/or a method can perform a process with a method including capturing a first plurality of images that include a foreground object and a background, capturing a second plurality of images that include the background, generating an alpha matte based on the first plurality of images and the second plurality of images using a trained machine learned model trained using a loss function configured to cause the trained machine learned model to learn high-frequency details of the foreground object, generating a foreground object image based on the first plurality of images and the second plurality of images using the trained machine learned model, and synthesizing an image including the foreground object image and a second background scene using the alpha matte.

In a general aspect, a device, a system, a non-transitory computer-readable medium (having stored thereon computer executable program code which can be executed on a computer system), and/or a method can perform a process with a method including selecting an alpha matte generated using a trained machine learned model, selecting a first image that includes a foreground object generated using the trained machine learned model, selecting a background image, and synthesizing a second image that includes the foreground object image and the background image using the alpha matte, the first image and the alpha matte being generated using a trained machine learned model trained using a loss function configured to cause the trained machine learned model to learn high-frequency details of the foreground object.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations.

FIG. 4 illustrates a method for synthesizing an image according to an example implementation.

Figure 1A:
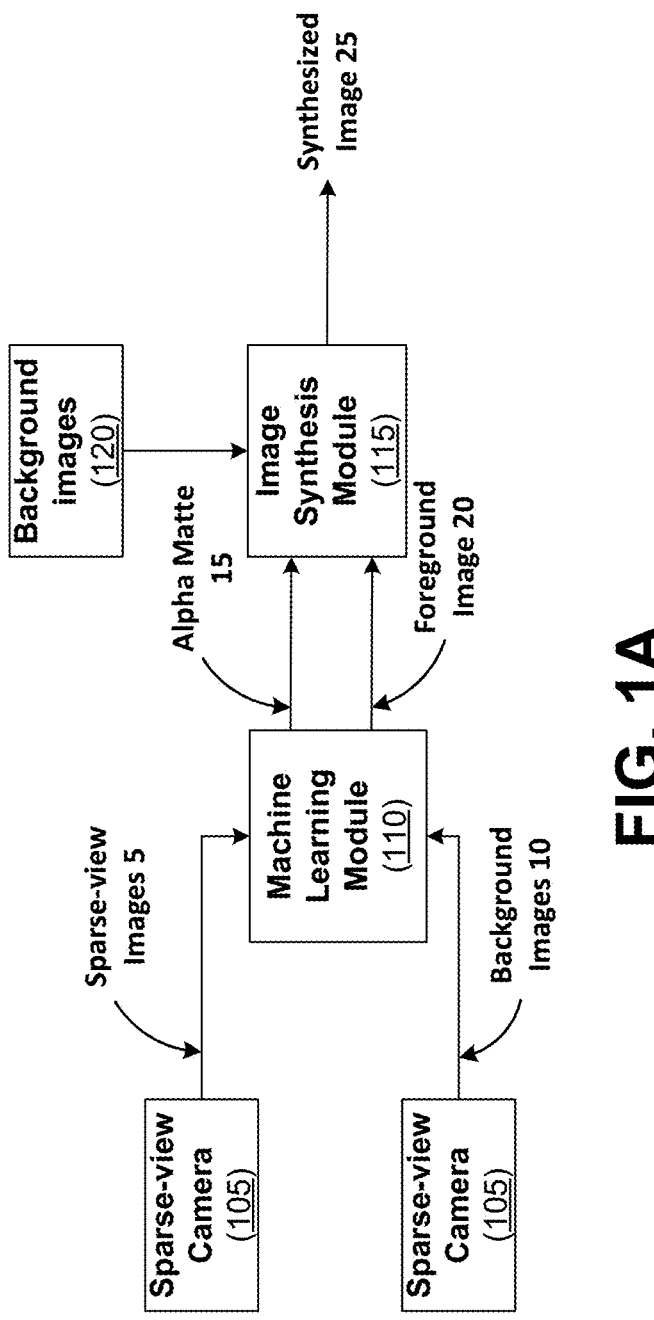
FIG. 1A illustrates a block diagram of a data flow for synthesizing an image according to an example implementation.

It should be noted that these Figures are intended to illustrate the general characteristics of methods, and/or structures utilized in certain example implementations and to supplement the written description provided below. These drawings are not, however, to scale and may not precisely reflect the precise structural or performance characteristics of any given implementation and should not be interpreted as defining or limiting the range of values or properties encompassed by example implementations. For example, the positioning of modules and/or structural elements may be reduced or exaggerated for clarity. The use of similar or identical reference numbers in the various drawings is intended to indicate the presence of a similar or identical element or feature.

DETAILED DESCRIPTION

Images are typically captured or sensed by a camera. The images can then be displayed on a computer display. Prior to displaying, the image can be post-processed (e.g., processed after capture processing) in some way and then rendered for display. Post-processing (e.g., using an image editing software tool) can manipulate the image in many ways. As an example, some portion of the image can be changed or replaced with a different image portion. If the portion of the image is fuzzy (typically at transitions, e.g., human hair) around where the portion of the image is changed, details associated with the fuzzy portion of the image can be lost.

A technical problem can be that capturing and rendering images with foreground objects with elements having portions (e.g., borders, edges, and the like) that are disjointed and/or semitransparent can be a challenge, particularly at high-resolution. For example, a foreground object can be a human. The hair of the human can have border(s) and/or edge(s) that are disjointed and/or semitransparent (or visually unclear, blurry, fuzzy, and the like). Therefore, a technical problem can be that rendering images with foreground objects including, for example, human hair can be a challenge, particularly at high-resolution. This is because hair strands are a poor fit for traditional explicit 3D representations like meshes or point clouds, and so are generally poorly reconstructed by typical multi-view capture systems.

To render photorealistic images with foreground objects with a border(s) having portions that are disjointed and/or semitransparent (e.g., human heads) at high resolution the semitransparent nature of foreground objects (e.g., hair) must be taken into account. A technical solution can include performing accurate alpha matting in regions with fine structures and disjointed and/or semitransparent boundaries. Accurate alpha matting can be challenging even with the aid of background information, due to limited RGB observations: the opacity values in disjointed and/or semitransparent regions typically exhibit small differences in pixel intensity. RGB renderings and corresponding alpha mattes are crucial to enable synthesizing photorealistic compositions from different viewpoints and with different backgrounds.

The technical solution to accurately model alpha mattes with an intricate geometry can include a cone-based ray casting NeRF with an annealing patch-wise smoothness term to regularize the training process of a machine learned model. A Sobel field can be included to preserve high-frequency spatial gradients and improve the modeling of thin structures like hair. A technical effect can be that a photorealistic image with a high-resolution, multi-view consistent appearance can be synthesized even when portions of a modified image are disjointed and/or semitransparent.

Figure 1B:
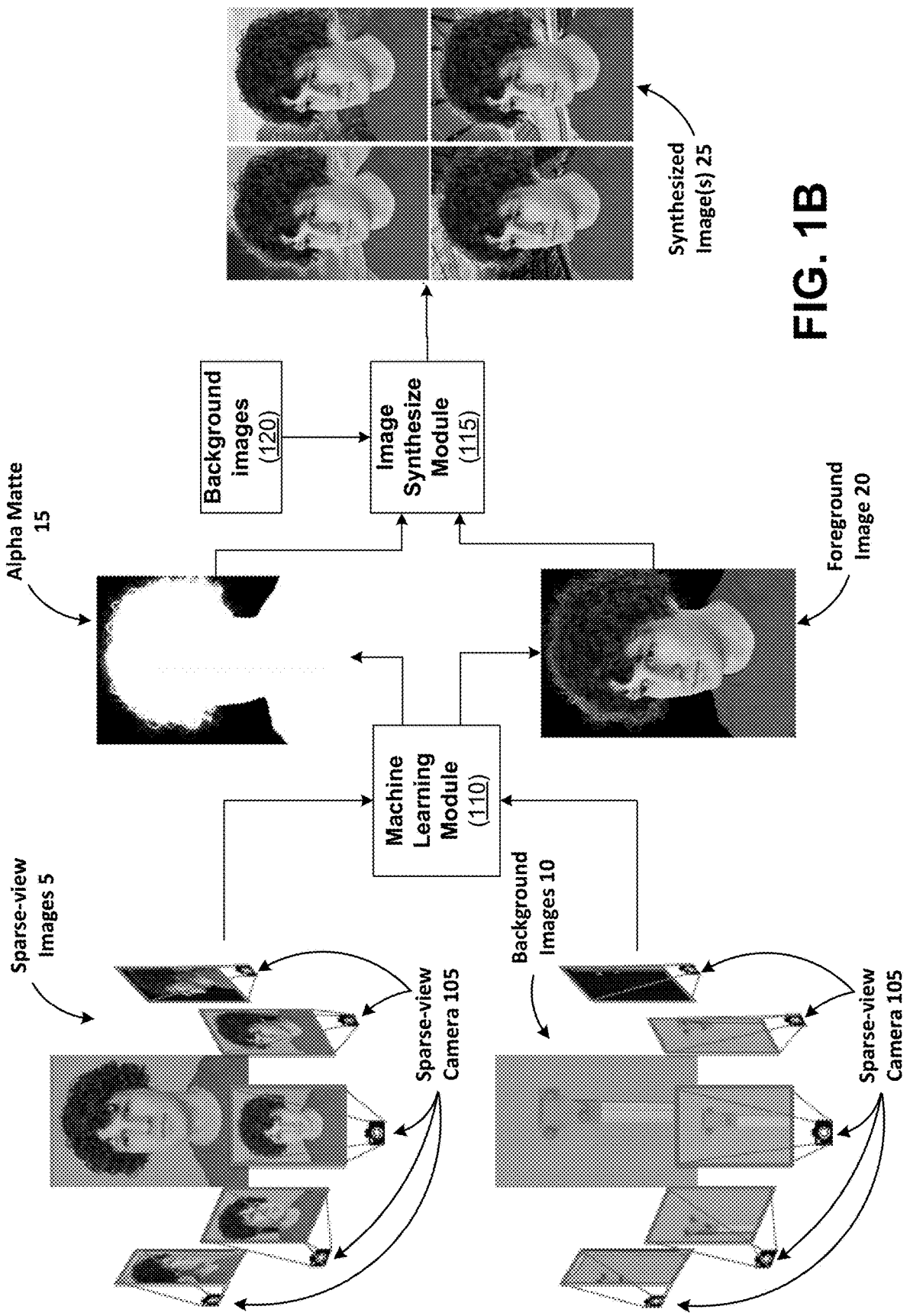
FIG. 1B illustrates a block diagram of a data flow for synthesizing an image according to an example implementation.

FIG. 1A illustrates a block diagram of a data flow for synthesizing an image according to an example implementation. FIG. 1B illustrates a block diagram of a data flow for synthesizing an image according to an example implementation. As shown in FIGS. 1A and 1B, the data flow can include a sparse-view camera 105 block, a machine learning module 110 block, an image synthesis module 115 block, and a background images 120 block. The sparse-view camera 105 can be a camera rig including a plurality of cameras. The sparse-view camera 105 can be sparse because the camera rig can include a limited (e.g., a few, minimal, and the like) number of cameras. For example, the sparse-view camera 105 can be a camera rig including 3, 5, 6, 7, 9, 10, etc. cameras. For example, the sparse-view camera 105 illustrated in FIG. 1B includes 5 (5) cameras.

In FIGS. 1A and 1B, two sparse-view camera 105 are shown. However, in some implementations, one sparse-view camera 105 can be used for two operations. For example, in a first operation sparse-view camera 105 can be used to capture sparse-view images 5 and in a second operation sparse-view camera 105 can be used to capture background images 10. In the first operation the sparse-view camera 105 can be used to capture a first plurality of images that include a foreground object on a first background scene as the sparse-view images 5. Further, in the second operation the foreground object can be removed from the view of the sparse-view camera 105 and the sparse-view camera 105 can be used to capture a second plurality of images that include the first background scene as the background images 10. The foreground object can be, for example, a human or a portion of a human. In some implementations, the foreground object can include an element(s) having a disjointed and/or semitransparent portion (e.g., hair).

The machine learning module 110 can be configured to generate an alpha matte and a foreground image based on the sparse-view images 5 and the background images 10. The machine learning module 110 can include a machine learned model. The machine learning module 110 can be configured to train the machine learned model. The machine learning module 110 can be configured to train the machine learned model using the sparse-view images 5 and the background images 10. In some implementations, the training, generating the alpha matte and generating the foreground image are performed (e.g., processed) together where the completion of the training of the machine learned model completes when the alpha matte and the foreground image are generated.

Image synthesis can be the process of artificially generating images that contain some particular desired content. For example, image synthesis can include combining (e.g., mapping) portion(s) of two or more images into a combined image. Image synthesis can be performed using, for example, an image-to-image translation network and/or a generative adversarial network (GAN). In some implementations, image synthesis can include removing (e.g., filtering, masking, and the like) a portion of an image and replacing the removed portion of an image with another image.

The image synthesis module 115 can be configured to synthesize (e.g., generate) photorealistic images using the alpha matte and the foreground image. The image synthesis module 115 can be configured to synthesize (e.g., generate) the synthesized image 25. For example, a background image can be selected from the background images 120. The selected background image can have a different background scene (or second background scene) than the background scene (or first background scene) of the background images 10. The image synthesis module 115 can be configured to synthesize (e.g., generate) photorealistic images using the alpha matte, the foreground image, and the background scene (or second background scene) of the selected background image as the synthesized image 25.

In some implementations, the image synthesis module 115 can be configured to remove a portion of the selected background image using the alpha matte and replacing the removed portion with the foreground image. In some implementations, the image synthesis module 115 can be configured to use an image-to-image translation network and/or a GAN to remove a portion of the selected background image using the alpha matte and replacing the removed portion with the foreground image. Therefore, synthesized image 25 can include the background scene (or second background scene) of the selected background image and the foreground image of the sparse-view images 5.

In some implementations, the image synthesis module 115 can be configured to generate the foreground object with a new viewpoint. A viewpoint can be a view from the perspective of the camera. For example, the foreground object can be generated with a viewpoint not of one of the cameras of the sparse-view camera 105. In some implementations, the image synthesis module 115 can be configured to generate the foreground object with a new viewpoint that is in-between two cameras of the sparse-view camera 105. For example, the foreground object with a new viewpoint can be extrapolated from foreground objects associated with images captured by two cameras of the sparse-view camera 105. In some implementations, the image synthesis module 115 can be configured to modify the alpha matte based on the foreground object with the new viewpoint, remove a portion of the selected background image using the modified alpha matte and replacing the removed portion with the foreground image with the new viewpoint.

In some implementations, an Alpha-NeRF can be a NeRF-based framework used for high-resolution, multi-view consistent appearance and transparency modelling from a sparse number of views. Alpha-NeRF can include casting a cone from each pixel to minimize aliasing artifacts and leverages a proposal MLP to reason about the rough surface. MipNeRF360 draws a random RGB background color when compositing a pixel during training which supports reconstructing a fully opaque background. In some implementations, rather than drawing random RGB colors, a prerecorded set of images from the background can be used. Then a foreground color can be computed from the light emitted by the particle in the volume as the ray travels from near-to-far, composited on the top of the background RGB color. To handle the sparse-view training, a patch-wise smooth regularizer with an annealing strategy can be used to regulate the training process and preserve high fidelity. Additionally, in order to enhance the spatial signal and modeling fine details, a Sobel field can be used to capture high-frequency details of the subject (e.g., hair region, facial hair, and the like). Further, the learned density field can be refined to produce sharper details by concatenating features from the Sobel field and passing those through an additional MLP that outputs the final refined density value.

Figure 2:
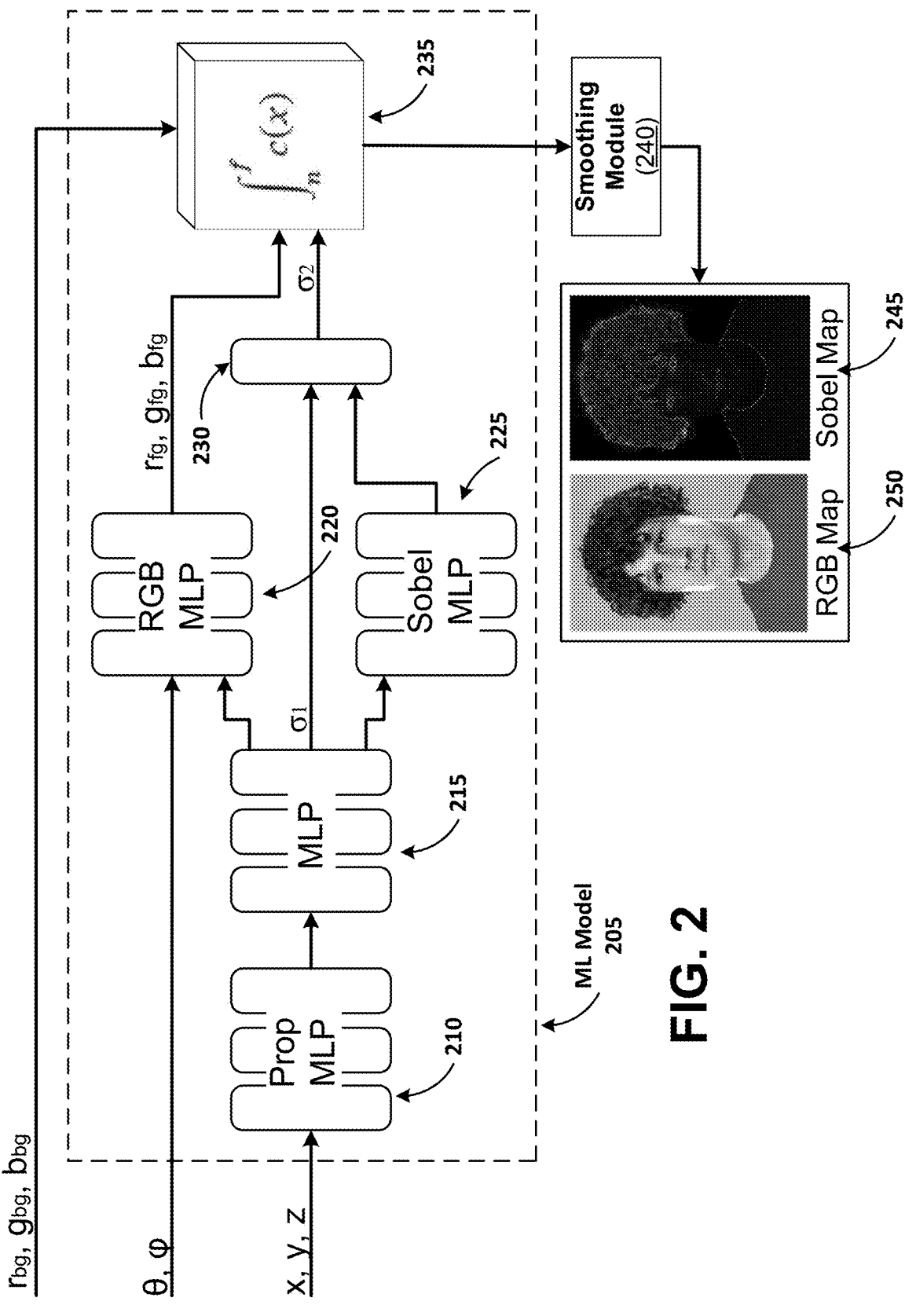
FIG. 2 illustrates a block diagram of a machine learned model for generating an image map(s) according to an example implementation.

FIG. 2 illustrates a block diagram of a machine learned model for generating an image map(s) according to an example implementation. The machine learned model 205 can implement the Alpha-NeRF or NeRF-based framework used for high-resolution, multi-view consistent appearance and transparency modeling from a sparse number of views.

In some implementations, the NeRF representation can include coarse and fine stages, with each stage incorporating two types of MLPs. The first or Prop MLP 210, $f_\sigma$, can take a 3D position x, y, z as input and outputs volume density $\sigma$ and a feature vector. The second or RGB MLP 220, $f_c$, combines the feature vector with a 2D viewing direction v to produce an RGB color c. This architecture can allow a variable output color for different viewing angles while the underlying geometry represented by $\sigma$ depends on a position. To render a pixel, a ray r(t)=o+td can be cast from the camera origin o into 3D space. Color can be determined by sampling distances $$\{t_i\}_{i=0}^N$$

along the ray and passing the corresponding points $r(t_i)$ and direction through the MLPs to calculate $\theta_i$ and $c_i$. The resulting output color can be obtained using the formula:

$$\hat{C}(r_{uv}) = \sum_{i=1}^N T_i \cdot \left(1 - e^{-\Delta_i \cdot \sigma_i}\right) \cdot c_i, \; T_i = \exp\left(-\sum_{m<i} \Delta_m \cdot \sigma_m\right) \quad (1)$$

where,
u and v denotes pixel coordinates,
$\Delta_i = t_i - t_{i-1}$ represents the sampled point interval,
ci indicates color intensity of each 3D point, and
$\sigma_i$ density.
NeRF iteratively resamples points $t_i$ to concentrate samples in dense areas. In order to represent higher frequency details, the inputs x and v can undergo sinusoidal positional encoding $\gamma_{PE}$:

$$\gamma_{PE}(z) = \left[\sin(2^0 z), \cos(2^0 z), \dots, \sin(2^{L-1} z), \cos(2^{L-1} z),\right] \quad (2)$$

where,
L denotes the number of positional encoding levels, and
z denotes the pixel coordinates or view directions.
However, the Prop MLP 210 $f_\sigma$ can overlook the relative pixel footprint and interval length $[t_{i-1}, t_i]$ along the ray $r_{uv}$, causing aliasing artifacts in novel camera trajectories. MLP 215 (or MipNeRF) can address this by sampling conical frustums based on the projected pixel footprint.

An alpha matte value for a pixel (u, v) can be denoted as $\alpha_{uv}$. The accumulated alpha matte value $\alpha_{uv}$ produced by NeRF can be challenging to capture very fine details and disjointed and/or semitransparent regions, especially when training on pixel intensity using a photometric loss, since NeRF may need to model the fractional transparency of the foreground disjointed and/or semitransparent regions as well as the background. This phenomenon can be exaggerated under the sparse view setting, with a limited number of observations.

Some implementations can incorporate background RGB colors into the volumetric rendering formula. Therefore, the expected value of light emitted by particles in the volume can be calculated as the ray traverses from near-to-far and composites on top of the background color:

$$\hat{C}(r_{uv}) = \sum_{i=1}^N T_i \cdot \left(1 - e^{-\Delta_i \cdot \sigma_i}\right) \cdot c_i + T_N \cdot c_{bg} \quad (3)$$

Example implementations can supervise on $\hat{C}$ during training. Further, the background color can be set to zero at test time in order to render the foreground. This can allow effective integration 235 of the background information into the NeRF-based method and enhance the quality of rendered foreground images.

One of the underlying reasons for the failure mode in sparse-view scenarios can be the self-supervised training nature of NeRF, where the 3D representation can be learned from calibrated 2D images without explicit 3D geometry constraints. Without any regularizers or constraints during training, NeRF can be susceptible to over-fitting on the limited observations of color images while failing to explain the 3D geometry consistently across multiple views. To address this issue, a smoothing module 240 can include a patch-wise smoothness prior that can be employed under NeRF framework, because real-world geometry tends to exhibit piece-wise smoothness, leading to significant improvements in fitting quality and utilize fewer viewpoints. The prior can be incorporated into a training loss and the expected depth can be calculated using $$\hat{d}(r_{uv}) = \sum_{i=1}^N T_i \cdot \left(1 - e^{-\Delta_i \cdot \sigma_i}\right) \cdot t_i,$$

and enforce the smoothness on the rendered depth by:

$$\mathcal{L}_{smooth}(\theta, r_{uv}) = \quad (4)$$
$$\sum_{u,v} \sum_{u,v=1}^{S_{patch}-1} \left(\hat{d}(r_{uv}) - \hat{d}(r_{u+1v})\right)^2 + \left(\hat{d}(r_{uv}) - \hat{d}(r_{uv+1})\right)^2$$

where,
$\Delta_i = t_i - t_{i-1}$,
$r_{uv}$ is the ray through pixel (u, v) of a patch, and
$S_{patch}$ is the size of the rendered patches.

However, in order to achieve detailed modeling of a subject (e.g., the human head), which includes not only a reasonable 3D geometry but also intricate details (e.g., hair). The patch-wise smoothness term can harm the second objective in modeling these disjointed and/or semitransparent regions. In order to apply a higher strength of regularization in the early stages of training while gradually decreasing the effect of the smoothness once the rough geometry has been adequately captured by the NeRF representation. In some implementations, a frequency regularization method that employs a linearly-decreasing annealing weight w to control the smoothness term based on the training time steps can be applied. The annealing patch-wise smoothness term can be defined as:

$$\mathcal{L}_{smooth}(\theta, r_{uv}, l, L, K) = \mathcal{L}_{smooth}(\theta, r_{uv}) \cdot w(l, L, K) \quad (5)$$

$$\text{with } w(l, L, K) = \begin{cases} \dfrac{K-1}{K} & \text{if } l \le K \\ 0 & \text{if } l > K \end{cases} \quad (6)$$

where,
the scalar w (l, L, K) represents the scaling factor for the loss function,
l denotes the current training iteration,
L denotes the total training iterations, and
K denotes the iterations in which the annealing regularization is applied.

Accurately performing alpha matting in regions with fine structures and disjointed and/or semitransparent boundaries can be challenging, even with the aid of background information, due to limited RGB observations. The opacity values in disjointed and/or semitransparent regions typically exhibit small differences in supervised pixel intensity, making it difficult for NeRF to capture subtle changes in 3D space. To address this issue, in some implementations, additional annotation-free signals can be used to highlight spatial changes in disjointed and/or semitransparent regions (e.g., the intricate geometry of hair). For example, a Sobel operator which convolves template kernels on the image I to obtains partial derivatives with respect to pixel coordinate u and v:

$$D_u = \begin{bmatrix} -1 & 0 & 1 \\ -2 & 0 & 2 \\ -1 & 0 & 1 \end{bmatrix} * I, \ D_v = \begin{bmatrix} -1 & -2 & -1 \\ 0 & 0 & 0 \\ 1 & 2 & 1 \end{bmatrix} * I \quad (7)$$

where,
* denotes the 2D spatial convolution operation.
The Sobel magnitude which combines both directions can be obtained by $$S_{uv} = \sqrt{D_u^2 + D_v^2}.$$

In some implementations, the Sobel MLP 225 or Sobel field MLP and Sobel map(s) 245 can represent the first-order spatial gradient. Therefore, in some implementations, Sobel map(s) 245 can be used to supervise training. A Sobel value of multi-view color images (e.g., RGB map 250) can be denoted as S and the estimated Sobel value as Ŝ. Most of the NeRF MLP (e.g., Prop MLP 210 and/or MLP 215) backbone layers can be shared. Therefore, this approach can incur minimal computational overhead. By capturing spatial gradient details in the Sobel field, the learned density in NeRF MLPs (e.g., Prop MLP 210 and/or MLP 215) can be refined. This can be achieved by employing a one-layer MLP 230 to fuse the density and spatial gradient features, facilitating further geometry refinement.

Combining all together, the training loss (e.g., the loss function) can be summarized as:

$$\mathcal{L} = \lambda_1 \underbrace{\left\| C(r_{uv}) - \hat{C}(r_{uv}) \right\|_2^2}_{\mathcal{L}_{photometric}} + \lambda_2 \underbrace{\left\| \alpha(r_{uv}) - \hat{\alpha}(r_{uv}) \right\|_1}_{\mathcal{L}_{alpha}} + \quad (8)$$

$$\lambda_3 \underbrace{\left\| S(r_{uv}) - \hat{S}(r_{uv}) \right\|_2^2}_{\mathcal{L}_{Sobel}} + \lambda_4 \underbrace{\mathcal{L}_{w\text{-}smooth}(l, L, K)}_{\mathcal{L}_{regularizer}} + \lambda_5 \underbrace{\mathcal{L}_{prop}}_{\mathcal{L}_{MipNeRF}}$$

where, $\mathcal{L}_{prop}$ stands for the loss term in the MLP used for online distillation, In $\mathcal{L}_{alpha}$, $\hat{\alpha}$ represents the accumulated alpha along the ray using the expression $$\sum_{i=1}^{N} T_i \cdot \left(1 - e^{-\Delta_i \cdot \sigma_i}\right),$$

and
α denotes the supervised alpha value.
In some implementations, supervised alpha mattes can be obtained through simulation for synthetic datasets, whereas for real datasets, supervised alpha mattes can be predicted using a supervised machine learning algorithm (e.g., BGMat-v2).

Figure 3:
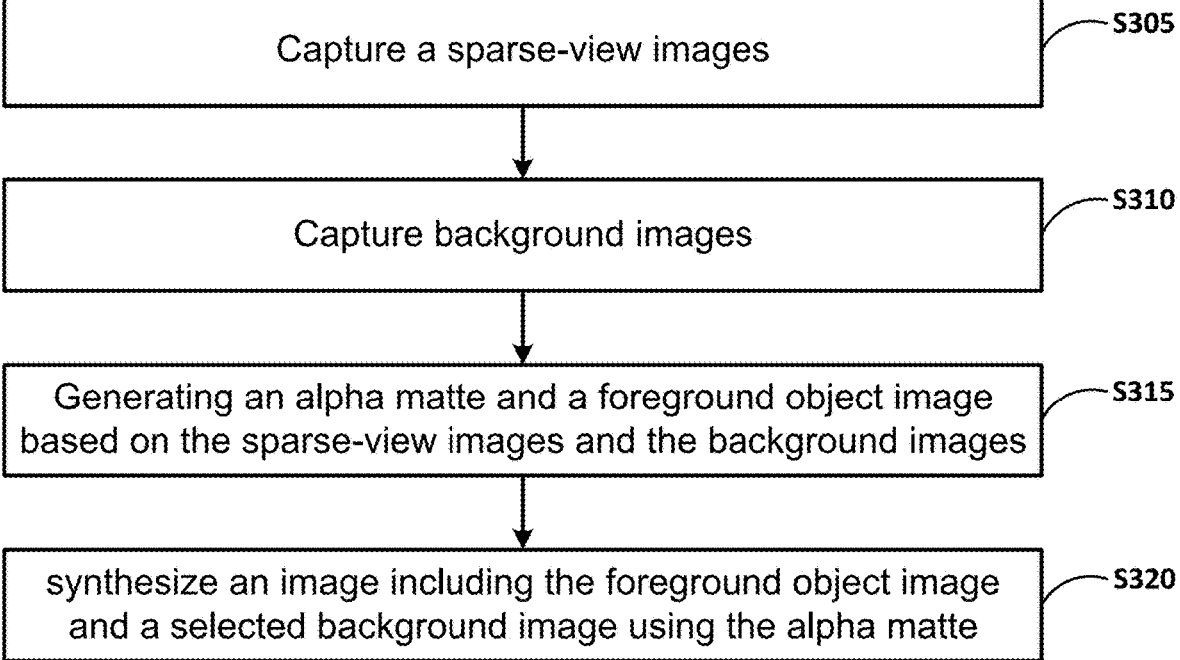
FIG. 3 illustrates a method for synthesizing an image according to an example implementation.

FIG. 3 illustrates a method for synthesizing an image according to an example implementation. As shown in FIG. 3, in step S305 sparse-view images are captured. For example, a camera rig including a plurality of cameras can be used to capture image(s). The camera rig (e.g., sparse-view camera 105) can include a minimal (e.g., sparse) number of cameras. (e.g., five (5) as illustrated in FIG. 1B). Therefore, the captured image(s) can be referred to as sparse-view images (e.g., sparse-view images 5). The sparse-view images can include a foreground object on a background scene. In some implementations, the foreground object can include elements having portions (e.g., borders, edges, and the like) that are disjointed and/or semitransparent. For example, a foreground object can be a human. The hair of the human can have border(s) and/or edge(s) that are disjointed and/or semitransparent (or visually unclear, blurry, fuzzy, and the like).

In step S310 background images are captured. For example, the foreground object can be removed from the view of the camera rig (e.g., sparse-view camera 105) and the camera(s) can be used to capture a second plurality of images that include the background scene (without the foreground object) as the background images. In some implementations, the same camera rig is used to capture the sparse-view images and the background images.

In step S315 an alpha matte and a foreground object image are generated based on the sparse-view images and the background images. For example, a machine learned model can be trained using the sparse-view images and the background images. The machine learned model and the training of the machine learned model are described above with regard to FIG. 2 In some implementations, the training, generating the alpha matte and generating the foreground image are performed (e.g., processed) together where the completion of the training of the machine learned model completes when the alpha matte and the foreground image are generated.

In step S320 an image including the foreground object image and a selected background image are synthesized using the alpha matte. For example, a background image can be selected from a memory storage location including background images (e.g., background images 120). The selected background image can have a different background scene (or second background scene) than the background scene (or first background scene) of the captured background images (e.g., background images 10). In some implementations a photorealistic image can be synthesized (e.g., generated) using the alpha matte, the foreground image, and the background scene (or second background scene) of the selected background image (e.g., as synthesized image 25).

In some implementations, a portion of the selected background image can be removed using the alpha matte and the removed portion can be replaced with the foreground image. Therefore, the image (e.g., synthesized image 25) can include the background scene (or second background scene) of the selected background image and the foreground image of the sparse-view images.

Example 1. FIG. 4 is a block diagram of a method for synthesizing an image according to an example implementation. As shown in FIG. 4 in step S415 generating an alpha matte based on the first plurality of images and the second plurality of images using a trained machine learned model trained using a loss function configured to cause the trained machine learned model to learn high-frequency details of the foreground object. In step S420 generating a foreground object image based on the first plurality of images and the second plurality of images using the trained machine learned model. In step S425 synthesizing an image including the foreground object image and a second background scene using the alpha matte.

Example 2. The method of Example 1, wherein the loss function configured to cause the trained machine learned model to learn high-frequency details of the foreground object can include a Sobel loss.

Example 3. The method of Example 1, wherein the trained machine learned model can be trained using a loss function including an annealing patch-wise smoothness loss.

Example 4. The method of Example 1, wherein the method can further include, referring to FIG. 4, in step S405 capturing the first plurality of images that include the foreground object and the background scene using a sparse-view camera rig and in step S410 capturing the second plurality of images that include the background scene using the sparse-view camera rig.

Example 5. The method of Example 1, wherein the trained machine learned model can be a neural network including a Sobel field multilayer perceptron (MLP).

Example 6. The method of Example 5, wherein a Sobel map can be used to supervise the training of the trained machine learned model.

Example 7. The method of Example 1, wherein the foreground object image is generated with a new viewpoint, the alpha matte is modified based on the foreground object image with the new viewpoint, and synthesizing of the image can include removing a portion of the background using the modified alpha matte and replacing the removed portion with the foreground image with the new viewpoint.

Figure 5:
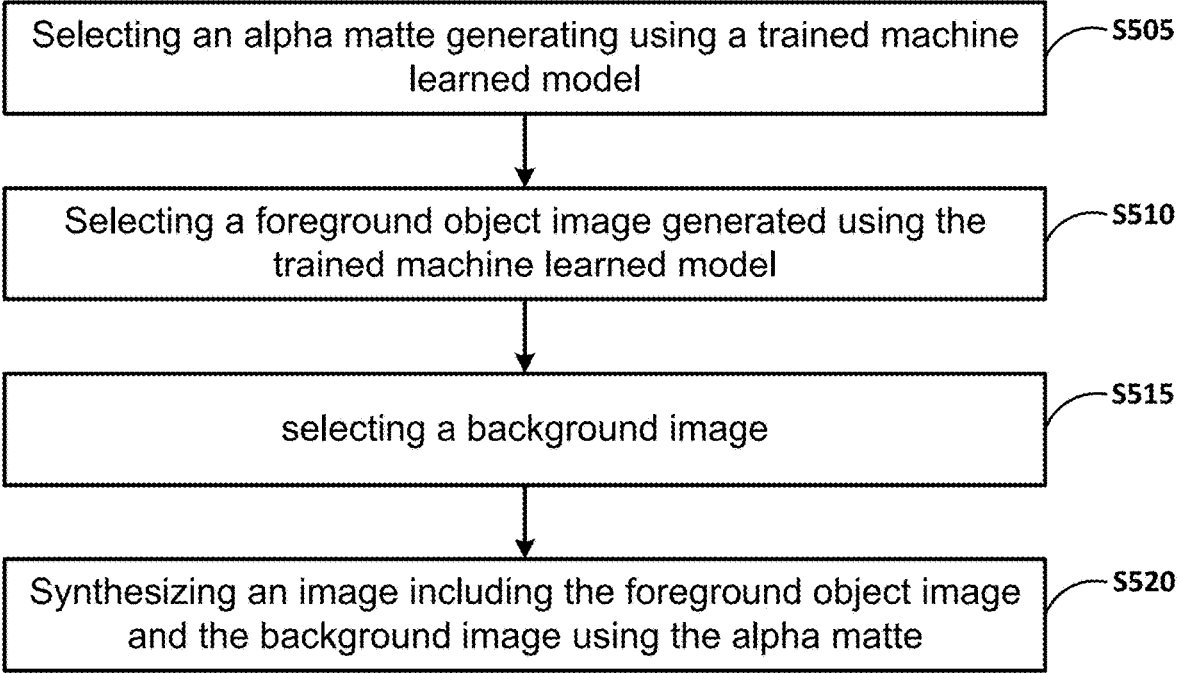
FIG. 5 illustrates a method for synthesizing an image according to an example implementation.

Example 8. FIG. 5 is a block diagram of a method of operating a . . . according to an example implementation. As shown in FIG. 5, in step S505 selecting an alpha matte generated using a trained machine learned model. In step S510 selecting a first image that includes a foreground object generated using the trained machine learned model. In step S515 selecting a background image. In step S520 synthesizing a second image that includes the foreground object image and the background image using the alpha matte, the first image and the alpha matte being generated using a trained machine learned model trained using a loss function configured to cause the trained machine learned model to learn high-frequency details of the foreground object.

Example 9. The method of Example 8, wherein the trained machine learned model can be trained using a first plurality of images including the foreground object and a background scene, a second plurality of images including the background scene, and a loss function including a Sobel loss.

Example 10. The method of Example 9, wherein the first plurality of images and the second plurality of images can be captured using a sparse-view camera rig.

Example 11. The method of Example 8, wherein the trained machine learned model can be trained using a loss function including an annealing patch-wise smoothness loss.

Example 12. The method of Example 8, wherein the trained machine learned model can be a neural network including a Sobel field multilayer perceptron (MLP).

Example 13. The method of Example 12, wherein a Sobel map can be used to supervise the training of the trained machine learned model.

Example 14. The method of Example 8, wherein the foreground object image is generated with a new viewpoint, the alpha matte is modified based on the foreground object image with the new viewpoint, and synthesizing of the image can include removing a portion of the background using the modified alpha matte and replacing the removed portion with the foreground image with the new viewpoint.

Example 15. A method can include any combination of one or more of Example 1 to Example 14.

Example 16. A non-transitory computer-readable storage medium comprising instructions stored thereon that, when executed by at least one processor, are configured to cause a computing system to perform the method of any of Examples 1-15.

Example 17. An apparatus comprising means for performing the method of any of Examples 1-15.

Example 18. An apparatus comprising at least one processor and at least one memory including computer program code, the at least one memory and the computer program code configured to, with the at least one processor, cause the apparatus at least to perform the method of any of Examples 1-15.

Figure 6:
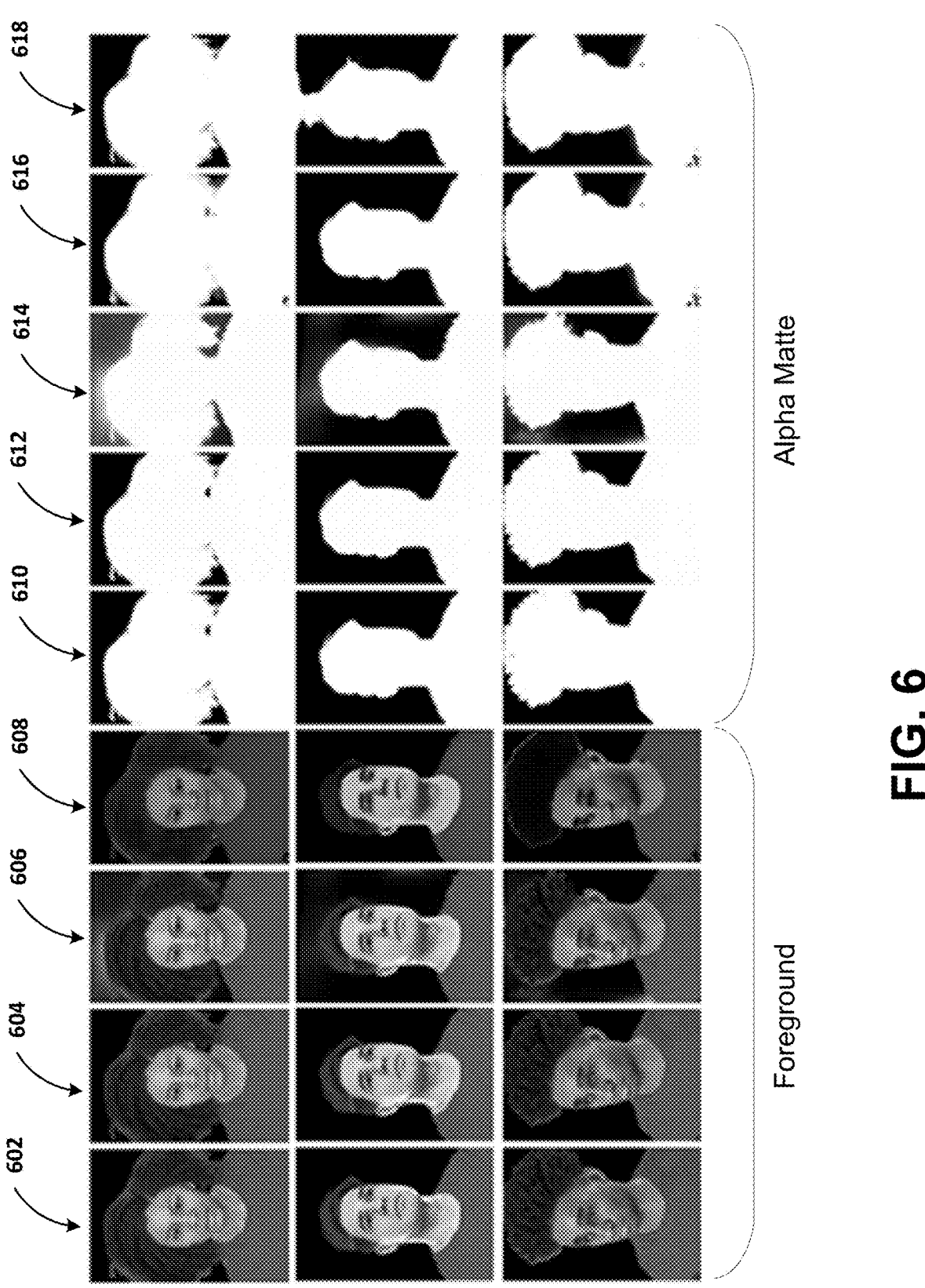
FIG. 6 pictorially illustrates foreground and alpha matte comparisons.

FIG. 6 pictorially illustrates foreground and alpha matte comparisons. As shown in FIG. 6, a column of foreground pictures 602, 604, 606, 608 and a column of alpha mattes 610, 612, 614, 616, 618 can illustrate comparisons between techniques for generating a foreground and an alpha matte. The column of foreground pictures 604 and the column of alpha mattes 612 illustrate foregrounds and alpha mattes generated using an example implementation which show the rendering of the foreground with a high fidelity and an alpha matte with finer details (e.g., of the hair). The column of foreground pictures 602, 606, and 608 and the column of alpha mattes 610, 614, 616, and 618 each have less than desirable qualities. For example, the column of foreground pictures 606 and the column of alpha mattes 614 illustrate foregrounds and alpha mattes generated using an existing technique that struggles to separate foreground from background.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A non-transitory computer-readable storage medium comprising instructions stored thereon that, when executed by at least one processor, cause a computing system to:

generate an alpha matte based on a first plurality of images that include a foreground object on a first background scene and a second plurality of images including the first background scene using a model trained using a loss function configured to cause the model to determine a geometry of the foreground object that has three dimensions and first high-frequency details of the foreground object in a first stage and to determine second high-frequency details of the foreground object in a second stage;

generate a foreground object image based on the first plurality of images and the second plurality of images using the model; and generate an image including the foreground object image and a second background scene using the alpha matte.

2. The non-transitory computer-readable storage medium of claim 1, wherein the loss function configured to cause the model to determine at least one of the first high-frequency details or the second high-frequency details of the foreground object includes a Sobel loss.

3. The non-transitory computer-readable storage medium of claim 1, wherein the loss function includes an annealing patch-wise smoothness loss.

4. The non-transitory computer-readable storage medium of claim 1, wherein the instructions further cause the computing system to:

capture the first plurality of images that include the foreground object and the first background scene using a sparse-view camera rig; and capture the second plurality of images that include the second background scene using the sparse-view camera rig.

5. The non-transitory computer-readable storage medium of claim 1, wherein the model is a neural network including a Sobel field multilayer perceptron (MLP).

6. The non-transitory computer-readable storage medium of claim 5, wherein a Sobel map is used to supervise the training of the model.

7. A method comprising:

selecting an alpha matte generated using a model;

selecting a first image that includes a foreground object generated using the model;

selecting a background image; and generating a second image that includes the foreground object and the background image using the alpha matte, the first image and the alpha matte being generated using the model trained using a loss function configured to cause the model to determine a geometry of the foreground object that is three dimensional and first high-frequency details of the foreground object in a first stage and to determine second high-frequency details of the foreground object in a second stage.

8. The method of claim 7, wherein the model is trained using a first plurality of images including the foreground object and a background scene, a second plurality of images including the background scene, and the loss function includes a Sobel loss.

9. The method of claim 8, wherein the first plurality of images and the second plurality of images are captured using a camera rig having greater than two and less than twenty cameras.

10. The method of claim 7, wherein the loss function includes an annealing patch-wise smoothness loss.

11. The method of claim 7, wherein the model is a neural network including a Sobel field multilayer perceptron (MLP).

12. The method of claim 11, wherein a Sobel map is used to supervise training of the model.

13. The method of claim 7, wherein the foreground object is generated with a new viewpoint, the alpha matte is modified based on the foreground object with the new viewpoint, and the generating of the second image includes removing a portion of the background image using the modified alpha matte and replacing the removed portion with the foreground object with the new viewpoint.

14. A method comprising:

generating an alpha matte based on a first plurality of images that include a foreground object on a first background scene and a second plurality of images including the first background scene using a model trained using a loss function configured to cause the model to determine a geometry of the foreground object that has three dimensions and first high-frequency details of the foreground object in a first stage and to determine second high-frequency details of the foreground object in a second stage;

generating a foreground object image based on the first plurality of images and the second plurality of images using the model; and generating an image including the foreground object image and a second background scene using the alpha matte.

15. The method of claim 14, wherein the loss function configured to cause model to determine at least one of the first high-frequency details or the second high-frequency details of the foreground object includes a Sobel loss.

16. The method of claim 14, wherein the loss function includes an annealing patch-wise smoothness loss.

17. The method of claim 14, wherein the method further comprises:

capturing the first plurality of images that include the foreground object and the first background scene using a sparse-view camera rig; and capturing the second plurality of images that include the second background scene using the sparse-view camera rig.

18. The method of claim 14, wherein the model is a neural network including a Sobel field multilayer perceptron (MLP).

19. The method of claim 18, wherein a Sobel map is used to supervise training of the model.

20. The method of claim 14, wherein the generating of the image includes removing a portion of the second background scene using the alpha matte and replacing the removed portion with the foreground object image.

* * * * *